United States Patent [15] 3,644,244
Fryd et al. [45] Feb. 22, 1972

[54] POLYBUTADIENE-POLYNITRILE GRAFT COPOLYMER DISPERSIONS STABILIZED WITH HYDROXYLAMINES

[72] Inventors: Michael Fryd, Broomall; Walter W. Kaminski, Chester, both of Pa.

[73] Assignee: E. I. du Pont de Nemours and Company, Wilmington, Del.

[22] Filed: Dec. 15, 1969

[21] Appl. No.: 791,497

[52] U.S. Cl. ............260/23 R, 117/132 R, 117/132 CB, 117/161 UD, 117/161 UN, 220/1 BC, 220/64, 260/23.7 N, 260/32.6 A, 260/32.6 N, 260/33.6 UA, 260/879
[51] Int. Cl. .............................................C08g 51/60
[58] Field of Search............260/879, 23.7 N, 32.6 A, 32.6 N, 260/23 R; 117/132 R, 132 CB, 161 UD, 161 UN; 220/1 BC, 64

[56] References Cited

UNITED STATES PATENTS

| | | | |
|---|---|---|---|
| 2,013,319 | 9/1935 | Semon | 18/50 |
| 3,095,388 | 6/1963 | Osmond et al. | 260/4 |
| 3,256,227 | 6/1966 | Kraus | 260/23.7 |
| 3,405,087 | 10/1968 | Fryd | 260/33.6 |
| 3,432,578 | 3/1969 | Martin | 260/880 |
| 3,449,471 | 6/1969 | Weitzel et al. | 260/880 |

FOREIGN PATENTS OR APPLICATIONS

| | | | |
|---|---|---|---|
| 1,222,249 | 8/1966 | Germany | 260/23.7 |

*Primary Examiner*—Donald E. Czaja
*Assistant Examiner*—Ronald W. Griffin
*Attorney*—Frederick F. Butzi

[57] ABSTRACT

Organosols of polybutadiene-polynitrile graft copolymers, stabilized against gelation by hydroxylamines. These compositions are useful as can coatings.

28 Claims, No Drawings

POLYBUTADIENE-POLYNITRILE GRAFT COPOLYMER DISPERSIONS STABILIZED WITH HYDROXYLAMINES

BACKGROUND OF THE INVENTION

Organosols of graft copolymers having saturated or unsaturated polymeric backbone components and one or more graft components, at least one of which is a polymer or copolymer of an ethylenically unsaturated nitrile, are useful as can-coating compositions. Organosols of graft copolymers having diene backbones and polymethacrylonitrile or polyacrylonitrile grafts are useful for this purpose. Organosols of graft copolymers having polybutadiene backbones and polymethacrylonitrile or polyacrylonitrile grafts, and organosols of graft copolymers having polybutadiene backbones and polymethacrylonitrile and polyvinylchloride grafts, are especially useful for this purpose. All this is disclosed in greater detail in U.S. applications Ser. No. 756,359 and Ser. No. 756,360, now abandoned, both filed Aug. 30, 1968. These applications are hereby incorporated into this application to show how the graft copolymers and organosols are prepared and how they are used.

These organosols have given excellent results as can coating compositions, but it has been observed that they tend to gel somewhat on extended storage.

SUMMARY OF THE INVENTION

It has now been found that the storage life of such compositions can be significantly lengthened by adding to them from 0.1 percent through about 10 percent, by weight of the solids, of a substituted hydroxylamine.

This not only improves the storage life of the compositions, but also makes it possible to add variable valence metal salts to them to reduce their curing times and to lower their curing temperatures. It has been found, for example, that an organosol lacking a hydroxylamine but containing such a metal salt will gel in from two to three days at room temperature. When a hydroxylamine is added to the organosol according to this invention, it can be stored for up to six months at room temperature without gelation.

The hydroxylamines used in the compositions have the structural formula (1) 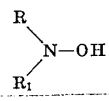

where
R and $R_1$ can be hydrogen, alkyl, alkenyl, or alkynyl radicals of 1–12 carbon atoms,
alkyl, alkenyl or alkynyl radicals of 1–12 carbon atoms substituted with —COOH, halogen, —OH, —$NH_2$, —SH, —CN or —$NO_2$ radicals,
alkyl ether radicals of 1–12 carbon atoms,
thioether radicals of 1–12 carbon atoms,
alkylamine radicals of 1–12 carbon atoms,
alkyl ester radicals of 2–12 carbon atoms,
keto radicals of 3–12 carbon atoms,
alkyl aldehyde radicals of 2–12 carbon atoms,
aralkyl radicals having a total of 12 carbon atoms,
phenyl radicals,
substituted phenyl radicals or
naphthyl radicals.

Preferred for use are compounds of this structure where R and $R_1$ are alkyl radicals. Especially preferred is N,N-diethyl hydroxylamine.

The graft copolymer organosols themselves can be prepared as described in applications Ser. No. 756,359 and Ser. No. 756,360. To prepare a composition of this invention one simply takes such an organosol and mixes with it from about 0.1 percent through about 10 percent, preferably 0.5 percent, by weight of the total solids, of a substituted hydroxylamine.

The addition of a hydroxylamine to the composition in no way affects its excellence as a can coating. The composition can be applied and baked as disclosed in the above-mentioned earlier applications, with the same result.

In addition, the curing time and curing temperature of this composition can be reduced, without affecting its storage life, by adding from about 20 through about 10,000 parts per million of one or more fatty acid salts of variable valence metals such as iron, cobalt, nickel, manganese, cerium, zinc, or lead, preferably manganese octoate or cerium octoate, or even more preferably a combination of the two.

DESCRIPTION OF THE PREFERRED EMBODIMENTS

The invention will be more easily understood and readily practiced by referring to the following illustrative examples, in which all parts are by weight.

EXAMPLE 1

Polybutadiene, 339 parts (54 percent solution in liquid aliphatic hydrocarbon, boiling point 140°–170° C.), 120 parts of methacrylonitrile, 209 parts of liquid aliphatic hydrocarbon (boiling point 140°–170° C.) and 3 parts of tertiary butyl peroxy isobutyrate were mixed in a kettle. This mixture was stirred and heated to 80° C. The temperature of the reaction mass rose to 85° C. without further heating, and was then held at 84°–87° C. for 2 hours.

At this point, another 1.5 parts of the peroxide catalyst in 9.8 parts of the liquid aliphatic hydrocarbon were added and the mixture held at 85°–90° C. for 2 hours.

The reaction mass was then cooled to 80° C. and unreacted methacrylonitrile removed under a vacuum of 45–55 millimeters. The temperature of the product was raised to 90° C., and then cooled to 65° C.

At this point, 47.8 parts of liquid aliphatic hydrocarbon and 38.6 parts of cellosolve acetate were added to give a tan dispersion containing 41 percent of a graft copolymer having 63 percent of a polybutadiene backbone and 37 percent of polymethacrylonitrile graft component. The particle size of the graft copolymer was less than 0.05 micron.

The resulting dispersion was divided into four equal portions. The first was left as is. To the second portion was added 0.35 part of N,N-diethyl hydroxylamine. To the third portion were added 1.2 parts of a 6 percent solution of manganese octoate in an aliphatic hydrocarbon and 1.2 parts of a 6 percent solution of cerium octoate in an aliphatic hydrocarbon. To the fourth were added 0.35 part of N,N-diethyl hydroxylamine and 1.2 parts each of the manganese octoate and cerium octoate solutions.

These compositions gave the following results on storage:

| Portion | Hydroxylamine | Metal Salt | Stability at Room Temperature |
|---|---|---|---|
| 1 | Absent | Absent | Gels in 2–3 months |
| 2 | Present | Absent | Stable for at least 6 months |
| 3 | Absent | Present | Gels in 3 days |
| 4 | Present | Present | Stable for at least 6 months |

Portions 2 and 4 were coated on raw steel sheets and baked for twelve minutes at 390° F. to give hard coatings 0.5 mil thick. The sheets were then formed into beverage cans. Beer stored in the cans took on no taste from the linings.

Portion 4 was also baked at 390° F. for only 5 minutes with satisfactory results.

EXAMPLE 2

Fifty parts of polybutadiene, 50 parts of acrylonitrile, 160 parts of VM and P naphtha and 0.5 part of tertiary butyl perpivalate were mixed, stirred and heated to 85° C. The temperature of the reaction mass rose without further heating and at the end of 1 hour stood at 92° C. The temperature remained at this level for 15 minutes without further heating. The mixture was then allowed to cool to room temperature.

The resulting dispersion of graft copolymer, having a polybutadiene backbone component and an acrylonitrile graft component in a backbone/graft ratio of 67/33, contained 30 percent polymer solids.

To this dispersion was added 0.5 part of N,N-diethylhydroxylamine. The dispersion remained ungelled for at least 6 months at room temperature.

EXAMPLE 3

Polybutadiene, 339 parts (54 percent solution in liquid aliphatic hydrocarbon, boiling point 150°–170° C.), 120 parts of methacrylonitrile, 209 parts of liquid aliphatic hydrocarbon (boiling point 140°–170° C.) and 3 parts of tertiary butyl peroxy isobutyrate were mixed in a kettle. This mixture was stirred and heated to 80° C. The temperature of the reaction mass rose to 85° C. without further heating, and was then held at 84°–87° C. for 2 hours.

At this point, 1.5 parts of the peroxide catalyst in 9.8 parts of the liquid aliphatic hydrocarbon were added and the mixture was held at 85°–90° C. for 2 hours.

The reaction mass was then cooled to 80° C. and unreacted methacrylonitrile was removed under a vacuum of 45–55 millimeters. The temperature of the product was raised to 90° C., and then cooled to 65° C.

At this point, 47.8 parts of liquid aliphatic hydrocarbon and 38.6 parts of cellosolve acetate were added, to give a tan dispersion containing 41 percent of a graft copolymer having 63 percent polybutadiene backbone and 37 percent of a graft component of polymethacrylonitrile. The particle size of the graft copolymer was less than 0.05 micron.

Two hundred parts of the resulting dispersion, 1.6 parts of cumene hydroperoxide and 1.6 parts of water were mixed and cooled to 0° C. To this mixture were then added 88 parts of vinyl chloride gas, 1.2 parts of benzoin and 0.3 part of ferrous octoate solution in liquid aliphatic hydrocarbon (6 percent iron content). This mixture was heated to 5° C. and stirred for 8 hours, the temperature rising slowly to 16° C. during this period.

Unreacted vinyl chloride monomer and liquid hydrocarbon were then stripped from the mixture under a vacuum of 20 mm., at room temperature.

The resulting product was a thick yellow dispersion, 52 percent solids, of a graft copolymer having 46 percent of a polybutadiene backbone, 25 percent of a polymethacrylonitrile graft and 29 percent of a polyvinyl chloride graft.

To this dispersion was added 1.96 part of N,N-diethylhydroxylamine. The dispersion remained ungelled for at least 6 months at room temperature.

The stabilized dispersions of Examples 2 and 3 can be coated on raw steel sheets and processed as shown in Example 1 with satisfactory results.

We claim:
1. A liquid composition comprising
a. a graft copolymer having a backbone component comprising an unsaturated polymer or a saturated polymer which provides grafting sites and at least one graft component one of which comprises a polymer or a copolymer of an ethylenically unsaturated nitrile;
b. an organic liquid carrier and
c. as an anti gelation agent, from 0.1 percent to about 10 percent, by weight of the total solids of the composition, of a compound having the structure

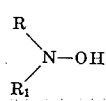

where R and $R_1$ are hydrogen, alkyl, alkenyl or alkynyl radicals of 1–12 carbon atoms,
alkyl, alkenyl or alkynyl radicals of 1–12 carbon atoms substituted with —COOH, halogen, —OH, —$NH_2$, —SH, —CN, or —$NO_2$ radicals,
alkyl ether radicals of 1–12 carbon atoms,
thioether radicals of 1–12 carbon atoms,
alkylamine radicals of 1–12 carbon atoms,
alkyl ester radicals of 2–12 carbon atoms,
keto radicals of 3–12 carbon atoms,
alkyl aldehyde radicals of 2–12 carbon atoms,
aralkyl radicals having a total of 12 carbon atoms,
phenyl radicals,
substituted phenyl radicals or
naphthyl radicals.

2. The composition of claim 1 wherein the anti gelation agent is an N,N-dialkyl hydroxylamine.

3. The composition of claim 1 wherein the graft copolymer has a polybutadiene backbone and at least one polymethacrylonitrile graft component(s), the organic liquid carrier is an aliphatic hydrocarbon and the anti gelation agent is N,N-diethyl hydroxylamine.

4. The composition of claim 1 wherein the graft copolymer has a polybutadiene backbone and at least one polyacrylonitrile graft component(s), the organic liquid carrier is an aliphatic hydrocarbon and the anti gelation agent is N,N-diethyl hydroxylamine.

5. The composition of claim 1 wherein the graft copolymer has a polybutadiene backbone and at least one polymethacrylonitrile graft component and at least one polyvinylchloride graft component, the organic liquid carrier is an aliphatic hydrocarbon and the anti gelation agent is N,N-diethyl hydroxylamine.

6. The composition of claim 1 additionally containing from about 20 through about 10,000 parts per million of one or more variable-valence metal salts.

7. The composition of claim 2 additionally containing from about 20 through about 10,000 parts per million of one or more variable-valence metal salts.

8. The composition of claim 3 additionally containing from about 20 through about 10,000 parts per million of one or more variable-valence metal salts.

9. The composition of claim 8 wherein the metal salts are manganese octoate and cerium octoate.

10. The composition of claim 4 additionally containing from about 20 through about 10,000 parts per million of one or more variable-valence metal salts.

11. The composition of claim 5 additionally containing from about 20 through about 10,000 parts per million of one or more variable-valence metal salts.

12. The composition of claim 1 wherein the backbone component is a diene polymer.

13. The composition of claim 1 wherein the backbone component is a diene polymer and the ethylenically unsaturated nitrile is acrylonitrile.

14. The composition of claim 1 wherein the backbone component is a diene polymer and the nitrile is methacrylonitrile.

15. The composition of claim 13 wherein the anti gelation agent is an N,N-dialkyl hydroxylamine.

16. The composition of claim 14 wherein the anti gelation agent is an N,N-dialkyl hydroxylamine.

17. The composition of claim 12 additionally containing from about 20 to about 10,000 parts per million of one or more variable-valence metal salts.

18. The composition of claim 13 additionally containing from about 20 to about 10,000 parts per million of one or more variable-valence metal salts.

19. The composition of claim 14 additionally containing from about 20 to about 10,000 parts per million of one or more variable-valence metal salts.

20. The composition of claim 15 additionally containing from about 20 to about 10,000 parts per million of one or more variable-valence metal salts.

21. The composition of claim 16 additionally containing from about 20 to about 10,000 parts per million of one or more variable-valence metal salts.

22. A substrate coated with the composition of claim 1, heated to form a continuous film.

23. The substrate coated with the composition of claim 6, heated to form a continuous film.

24. A substrate coated with the composition of claim 12, heated to form a continuous film.

25. A substrate coated with the composition of claim 13, heated to form a continuous film.

26. A substrate coated with the composition of claim 14, heated to form a continuous film.

27. A substrate coated with a composition according to claim 15, heated to form a continuous film.

28. A substrate coated with a composition of claim 16, heated to form a continuous film.

* * * * *